Sept. 25, 1962 R. A. MAGNUSON 3,055,237
PLANETARY WINCH
Filed June 30, 1959 3 Sheets-Sheet 1

INVENTOR.
ROLAND A. MAGNUSON
BY
Barnes & Neal
ATTORNEYS

INVENTOR.
ROLAND A. MAGNUSON
*Barnes & Seed*
ATTORNEYS

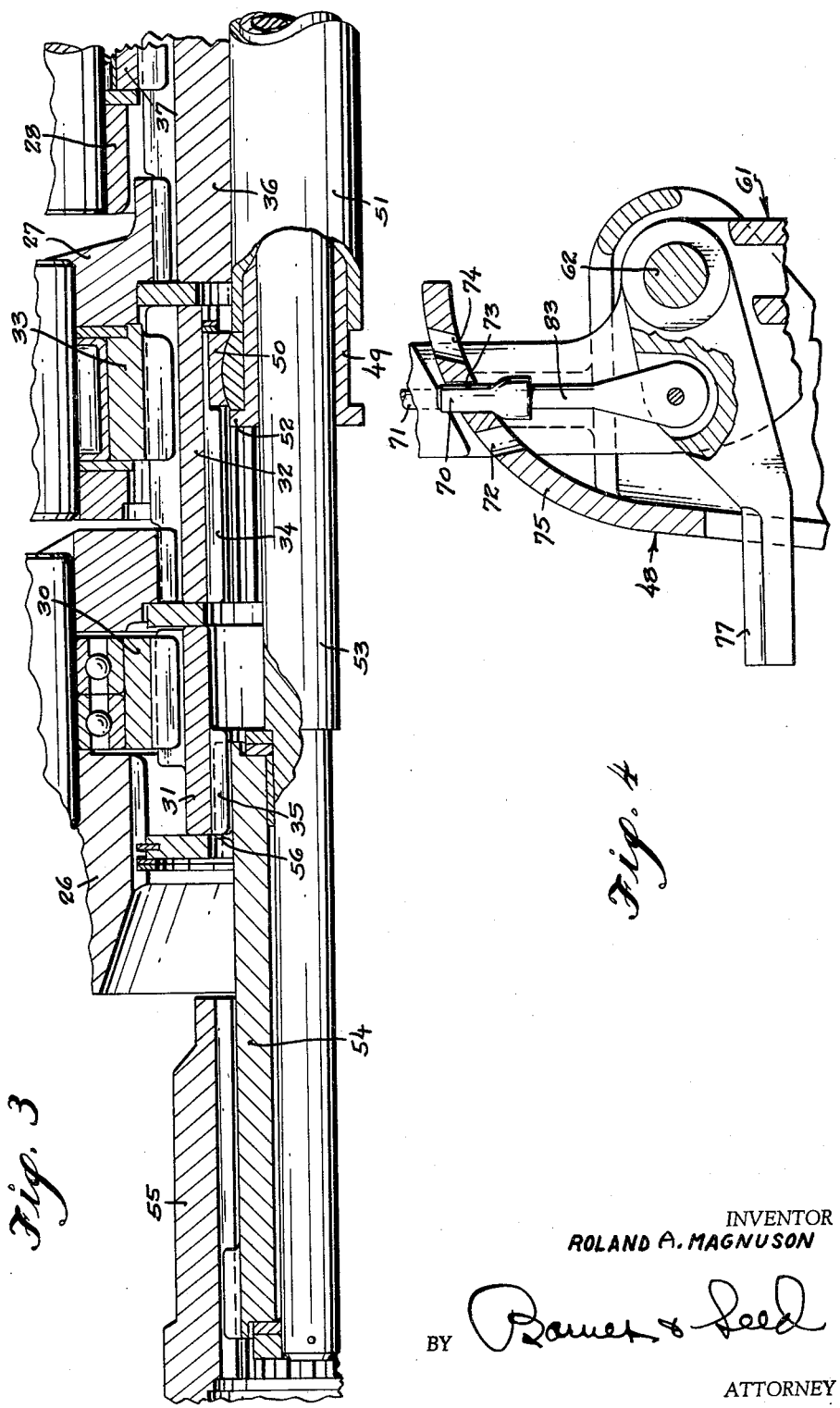

3,055,237
PLANETARY WINCH
Roland A. Magnuson, Seattle, Wash., assignor to Pacific Car and Foundry Company, Seattle, Wash., a corporation of Washington
Filed June 30, 1959, Ser. No. 823,904
11 Claims. (Cl. 74—789)

The invention relates to a power winch of a type using, or adapted to use, a reversible hydraulic motor as the power source, and for its principal objects aims to provide a ruggedly constructed planetary geared winch of compact design permitting changes in gear ratio to be made with ease and expedition, and one which is characterized in that the planetary gearing, ratio selector, bearings, and a drum-arresting brake are completely enclosed by the winch drum and a housing at each end thereof from which the drum takes its journal mounting and which provide, for the gear train and the bearings, an oilbath reservoir.

It is a further particular object to provide a winch of the described character providing two speeds and giving an unusually large reduction in the "low" ratio.

As a yet further important object the invention aims to provide a winch incorporating a plurality of planetary systems in a multi-stage reduction gear train so engineered that under driving conditions a reaction force is established working back from the pinions of a tail planetary to the planetary systems through which the reduction drive has previously passed so that planetary pinions of these preceding planetary systems assist the tail planetary in driving the winch drum.

The invention has the still further object of providing a simple and efficient hand-operated means for controlling the operation of the winch.

With the above and yet additional objects and advantages in view, and which will appear and be understood in the course of the following description and claims, the invention consists in the novel construction and in the adaptation and combination of parts hereinafter described and claimed.

In the accompanying drawings:

FIG. 3 is an enlarged-scale longitudinal vertical sectional view detailing a fragmentary part of the mechanism shown in FIG. 1; and FIG. 4 is a transverse vertical sectional view on line 4—4 of FIG. 2.

Figure 1:
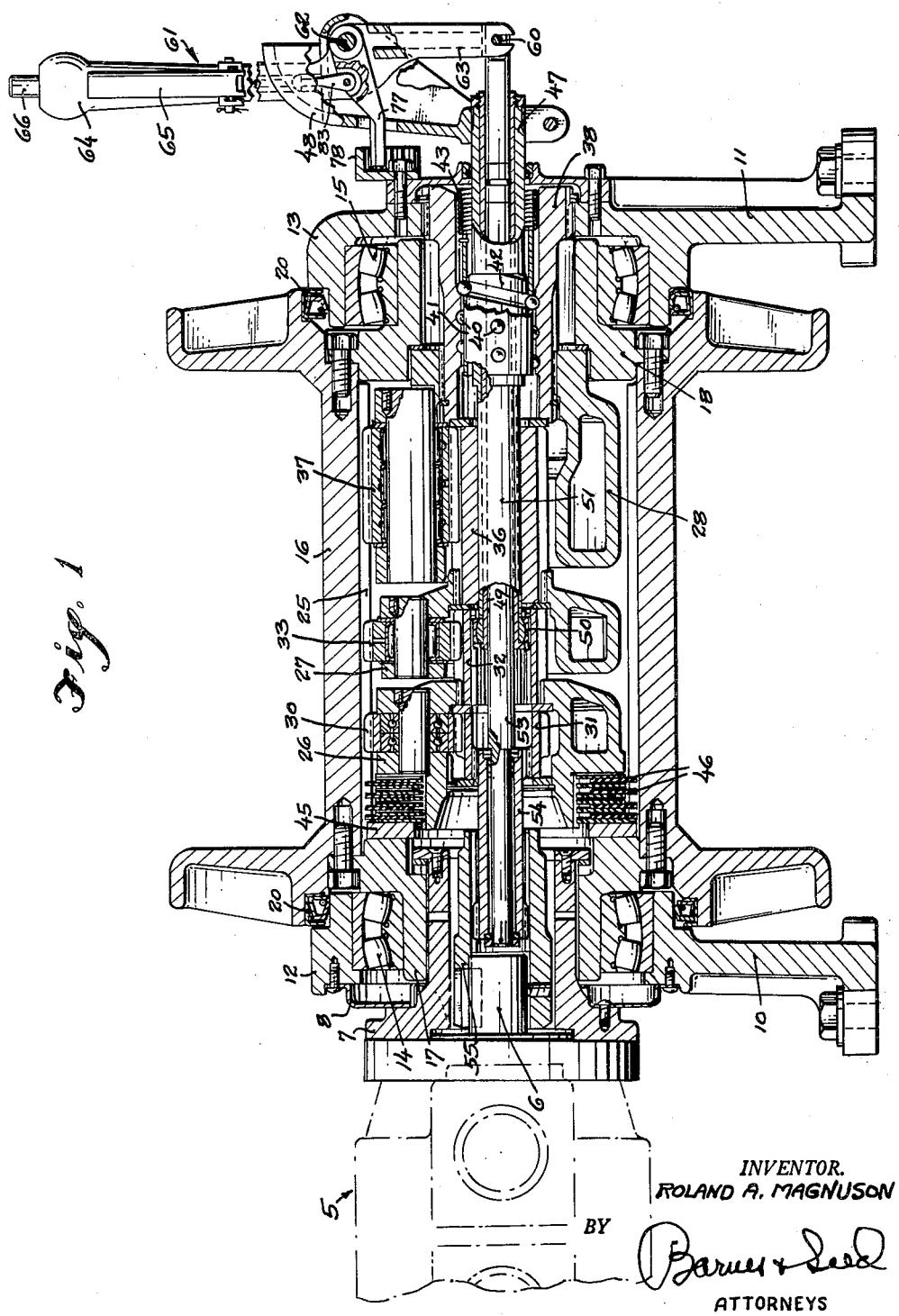
FIGURE 1 is a longitudinal vertical sectional view through a winch constructed to embody the preferred teachings of the present invention.
Figure 2:
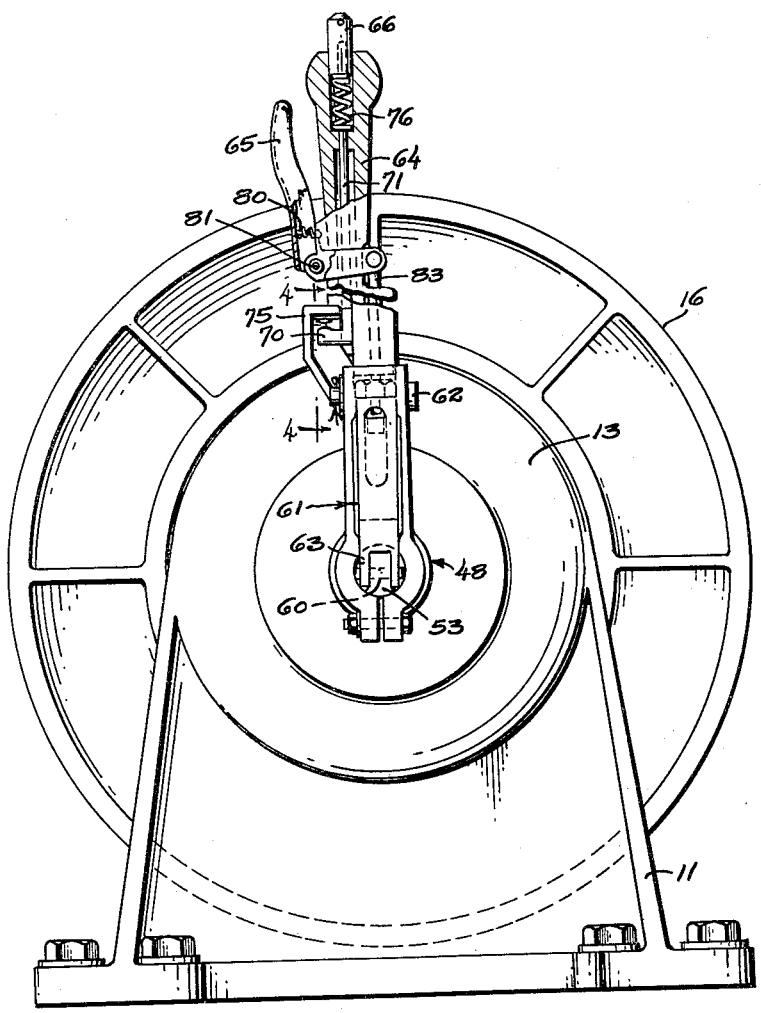
FIG. 2 is a front elevational view thereof.

The present invention is concerned only with the transmission and the controls therefor of a planetary-geared winch and this is to say that the particular source of power for driving the input end of the transmission is unimportant. The invention has been here shown as employing a reversible hydraulic motor as the power source. The hydraulic motor is designated generally by the numeral 5 and is shown in phantom other than for a motor-driven input shaft 6 for the transmission. 7 designates a mount for the motor which is attached by a closure member 8 to one of two axially spaced cheek bitts or standards 10 and 11 each bolted or otherwise rigidly secured to a foundation. Ring-shaped head portions 12 and 13 of the standards lie co-axial to one another and each performs the function of a housing for a respective set of roller bearings, as 14 and 15, producing a journal mounting for the related end of a winch drum 16 received for rotary motion between the two standards. Reduced neck prolongations 17 and 18 at each end of the winch drum form internal seats for the journal bearing, being each boltably secured to a respective end of the drum in order that access may be had to the interior of the drum for assembly and repair of transmission mechanisms housed therein. An oil seal 20 is provided at each end of the winch drum, occupying the pocket described by two facing annular recesses one provided by the drum and the other by a related one of the two journal housings 12 and 13.

In a manner which will hereinafter appear, the head 13 of the standard 11, this being the standard which lies in distal relation to said input shaft 6, in addition to its function of providing a housing for the related journal bearing, performs the office of an anchor footing against which the transmission mechanism takes a purchase in passing its gear-reduced drive from said input shaft to the drum. To reflect this latter function the concerned head will be hereinafter termed the anchor head. For clarity in description, the end of the transmission containing this anchor head will be referred to as the forward end.

The interior of the drum is provided throughout its perimeter with internal gear teeth 25 which I have here elected to show as being continuous, extending substantially the full length of the drum, or which is to say from the neck 17 at one end to the neck 18 at the other end. Three axially spaced sets of pinions mesh these teeth, and supporting each of these sets is a respective carrier, as 26, 27 and 28. Hereinafter termed first-stage, second-stage and third-stage carriers, the same occur successively one spaced axially from the other with the third-stage carrier being nearest to the anchor head.

Planetary pinions 30 of the first-stage carrier 26 are in constant mesh with a sun pinion 31. This sun pinion has an open center which is smooth-faced at the forward end and presents internal teeth 35 at the aft end. The carrier 26 is splined or otherwise drive-fitted upon a forwardly extending quill shaft 32 performing the function of a sun pinion for planetary pinions 33 of the second-stage carrier 27. Like the sun pinion 31, said quill shaft has an open center presenting at the aft end a counterpart 34 of the internal teeth 35 provided by such sun pinion, and the forward end is likewise smooth faced.

As with said first-stage carrier 26, the second-stage carrier 27 is drive-fitted upon a quill shaft 36 acting as a sun pinion for a set of surrounding, and in this instance, localized gears 37 carried by the third-stage carrier 28. Such third-stage carrier is localized against rotation by taking a spline fit upon a thimble 38 which is in turn splined to the anchor head 13. A retaining ring holds the thimble against endwise motion. Being formed internally with a spirally developed track for multiple balls 40 which are carried by a cage 41, the thimble 38 functions as a nut for a complementing screw 42 and will be hereinafter so termed. A torsion spring 43 centers the cage.

Within the winch drum, at its aft end between the first-stage carrier and a thrust-taking spacer 45, there is provided a set of brake friction plates 46. Alternate said plates are splined to the carrier while the intervening plates are splined to the drum. It is the office of the screw 42 to shift the first-stage carrier so as to selectively set or release the brake. The screw has a forwardly extending neck prolongation 47 exposed beyond the anchor head 13, and the exposed end of this neck is clamped by the hub end of a radially extending bracket 48 arranged to be moved manually through a moderate degree of swing travel. The responsive wrist motions imparted through neck 47 to the screw 42 advance or retract the screw within the nut according to whether the wrist motion is counter-clockwise or clockwise, considered from an end vantage point looking aft, and these "advance" and "retract" motions are passed to the first-stage carrier by a self-aligning bushing 50 contained in the smooth-faced forward end of the quill shaft 32 and clamped between the aft end of a rearwardly extending neck prolongation 51 of the screw and the terminal flange 52 of a tubular liner 49 which is fixedly secured to the screw.

Designated by 53 is a ratio selector shaft journaled for endwise motion within the liner 49. The aft end of this shaft projects rearwardly beyond the liner and is connected for unitary endwise motion to a shuttle spool 54 splined for endwise motion within a coupling 55 keyed to the input shaft 6. At its forward end the shuttle spool presents an externally toothed nose 56 which is the mating complement of the internal teeth 35 and the internal teeth 34 provided by the sun gear 31 and the quill shaft 32, respectively. Said nose projects beyond the coupling 55 and the shuttle motion of the spool moves between an aft limit whereat the teeth engage the teeth 35 of the sun gear 31 and a forward limit whereat the teeth engage the teeth 34 of the quill shaft 32. At an intermediate point in such motion the teeth 56 occupy the smooth-faced forward portion of the sun pinion and hence are in a neutral condition disengaged from both the sun pinion and the quill shaft.

Proceeding now to a description of the illustrated means by which wrist motion of the screw and endwise motion of the shuttle spool is controlled, it will be seen that the ratio selector shaft 53 is exposed by its forward end beyond the forward end of the screw's neck prolongation 47. A cross-pin 60 traverses the exposed end. A straight lever 61, first order, is carried by the bracket 48 for pivotal movement about a transverse pin 62 as a fulcrum. Upon one end said lever presents a fork 63 engaging the cross-pin 60 and upon the other end presents a handle 64 with which there is associated a compressible grip 65 and a depressible button 66.

The shuttle spool may preforce be shifted into any of its three referred-to positions, namely low, neutral, and high, by swinging the lever in a fore-and-aft direction about the fulcrum pin 62 as an axis, passing such motion to the ratio selector shaft by means of the fork 63. By such swing motion an upwardly directed finger 70, carried upon the lower end of a rod 71 which is fast to the button 66, is successively brought into register with a related one of the three mating sockets 72, 73 and 74 provided in a flange 75 formed upon the bracket and disposed concentric to the fulcrum pin 62. A spring 76, countering hand-exerted depressive force applied to the button, yieldingly urges the finger into said sockets.

The brake is activated by the swing-bracket 48 in the manner described, and namely by giving wrist motion to the screw 42. In order that the swing-bracket may be releasably set at any selected point within the permitted range of its swing travel there is provided a catch 77 pivoted to swing vertically about the fulcrum pin 62 as an axis and engageable by its free end with teeth formed in an arcuate flange 78 fixed to the anchor head in a position concentric with the swing axis of the bracket. The hand grip 65, which is compressible against the yielding restraint of a spring 80, is a substantial bell crank fulcrumed as at 81 to the handle 64. The responding arm of the bell crank is forked so as to straddle the handle and has its free end linked to the catch by a rod 83.

From the foregoing description it will be seen that there is provided a two-speed planetary-geared winch with an internal brake. The drum and journal housings completely enclose all of the gears, ratio selector, brake, and bearings, and provide an oilbath reservoir for the gear train and bearings. A combined ratio selector and brake handle controls the gear ratio of the winch, and provides a means of locking the same in any position.

The planetary system provides a compact means of power transmission, with large speed reduction. Low speed obtains when the shuttle spool is in the aft position represented in the drawings, whereupon the sun gear 31 drives the first-stage planetary pinions 30. Carrier 26 acts through its quill shaft 32 to drive the second-stage planetary pinion 33, and the carrier 27 responsively acts through its quill shaft 36 to drive the third-stage pinions 37. The third-stage carrier 28 is localized against rotation and its pinions 37 thus drive the winch drum. Since the pinions 37 are in fixed position, axis considered, a reaction force is established back through the second and first stage planetaries and pinions 30 and 33 consequently assist in driving the drum. The ratio in this maximum line pull "low" setting of the shuttle spool is 73 to 1. Upon shifting the shuttle spool to its forward limit of travel, the same traverses the "neutral" station, then is brought into engagement with the internal teeth 34 of the quill shaft 32. The input consequently by-passes the first-stage planetary and passes the drive directly to the pinions of the second-stage planetary system producing a 16.1 to 1 "high" ratio for fast operation of the winch.

It is thought that the invention will have been clearly understood from the foregoing detailed description of my now-preferred illustrated embodiment. Changes in the details of construction can perforce be adopted without departing from the spirit of the invention and it is accordingly my intention that no limitations be implied and that the hereto annexed claims be given a scope fully commensurate with the broadest interpretation to which the employed language fairly admits.

What I claim, is:

1. In a transmission, the combination of input and output members, a co-axial series of at least three gear systems two of which are first-stage and second-stage planetary systems including in each instance a respective sun gear together with a respective carrier supporting a respective set of planetary pinions in mesh with the related sun gear, and the other of which systems is a third-stage system including a central gear together with a carrier supporting a set of localized pinions surrounding and in mesh with the central gear, means for selectively driving the sun gear of the first or the second-stage planetary system of the series from the input member, means fixing the carrier of the third-stage system of the series against rotation, and means passing rotary motion from the carriers of the first-stage and second-stage planetary systems directly to the sun gear or to the central gear, as the case may be, of the next succeeding system of the series, the several sets of pinions being in each instance constantly in mesh with an internal gear fast to the output member.

2. Structure according to claim 1 characterized in that the input member may be disconnected at will from the planetary gear systems.

3. In a winch, a winding drum having a through-opening in its center, a co-axial series of at least three gear systems housed in said open center of the drum, two adjacent said systems serving as a first-stage system and a second-stage system, respectively, and being each a planetary gear system having a respective sun gear together with a respective carrier supporting a respective set of planetary pinions in mesh with the related sun gear, the other of said three gear systems serving as a last-stage system and having a central gear and a carrier supporting a set of pinions surrounding the central gear and in mesh therewith, means for driving the sun gear of the first-stage system of the series, means fixing the carrier of the last-stage system of the series against rotation, and means passing rotary motion from the carriers of each stage of said three systems of gears directly to the sun gear or the central gear, as the case may be, of the next succeeding system of the series, the several sets of pinions being in each instance constantly in mesh with an internal gear fast to the winding drum.

4. In a winch, a winding drum having a through-opening in its center, a co-axial series of at least three gear systems housed in said open center of the drum, two adjacent said systems serving as a first-stage system and a second-stage system, respectively, and being each a planetary gear system having a respective sun gear together with a respective carrier supporting a respective set of planetary pinions in mesh with the related sun gear, the other of said three gear systems serving as a last-stage system and having a central gear and a carrier supporting a set of pinions surrounding the central gear and in mesh therewith, a motor-driven toothed member movable from a neutral position inactive to any of said gear systems into driving engagement with the sun gear of either the first-stage or the second-stage system of the series, selectively, means fixing the carrier of the last system of the series against rotation, and means passing rotary motion from the carriers of each stage of said three systems of gears directly to the sun gear or the central gear, as the case may be, of the next succeeding system of the series, the several sets of pinions being in each instance constantly in mesh with an internal gear fast to the winding drum.

5. In a winch, a winding drum having a through-opening in its center, a co-axial series of at least three gear systems housed in said open center of the drum, two adjacent said systems serving as a first-stage system and a second-stage system, respectively, and being each a planetary gear system having a respective sun gear together with a respective carrier supporting a respective set of planetary pinions in mesh with the related sun gear, the other of said three gear systems serving as a last-stage system and having a central gear and a carrier supporting a set of pinions surrounding the central gear and in mesh therewith, a motor-driven toothed member movable from a neutral position inactive to any of said gear systems into driving engagement with the sun gear of either the first-stage or the second-stage system of the series, selectively, means operable at will for arresting the rotation of the carrier of the first-stage gear system relative to the drum so as to brake the drum, means fixing the carrier of the last-stage system of the series against rotation, and means passing rotary motion from the carriers of each stage of said three systems of gears directly to the sun gear or the central gear, as the case may be, of the next succeeding system of the series, the several sets of pinions being in each instance constantly in mesh with an internal gear fast to the winding drum.

6. In a transmission, the combination of input and output members, a co-axial series of at least three gear systems two of which are first-stage and second-stage planetary systems including in each instance a respective sun gear together with a respective carrier supporting a respective set of planetary pinions in mesh with the related sun gear, and the other of which systems is a third-stage system including a central gear together with a carrier supporting a set of localized pinions surrounding and in mesh with the related central gear, a shuttle spool constantly driven from the input member and shiftable at will from a position whereat the same drives the sun gear of the first-stage system of the series, drives the sun gear of the second-stage system of the series, or is inactive to all of said systems, means fixing the carrier of the last-stage system of the series against rotation, an operative interconnection causing the sun gear or the central gear, as the case may be, of the second-stage and the third-stage system of the series to rotate in unison with the carrier of the preceding system of the series, and brake means operable at will for arresting the rotation of one of the carriers of said series of systems, the several sets of pinions being in each instance constantly in mesh with an internal gear fast to the output member.

7. In a winch, a winding drum having a through-opening in its center presenting a full-length internal gear and provided at each end with a neck extending as a hollow prolongation of the drum, front and aft standards each presenting a respective bitt surrounding a related said neck, a journal bearing received between each bitt and its related neck, a respective seal at each end of the winch between the drum and the related bitt, a reversible hydraulic motor carried by the aft bitt to occupy an exposed position to the rear of the winch and providing a drive shaft extending axially of the drum into the hollow center of the neck which is prolonged from the aft end of the drum, a co-axial series of at least three gear systems housed in said open center of the drum, two adjacent said systems serving as a first-stage system and a second-stage system, respectively, and being each a planetary gear system having a respective sun gear together with a respective carrier supporting a respective set of planetary pinions in mesh with the related sun gear, the other of said three gear systems serving as a last-stage system and having a central gear and a carrier supporting a set of pinions surrounding the central gear and in mesh therewith, the pinions of all of said gear systems being in mesh with the internal gear of the drum, said sun gears for both the first-stage and the second-stage gear systems of the series having a hollow center formed with an internal gear, a spline connection to the front bitt from the carrier of the last-stage system of the series fixing said carrier against rotation, an operative interconnection causing the sun gear or the central gear, as the case may be of the second and each succeeding system of the series to rotate in unison with the carrier of the preceding system of the series, a shuttle spool received for endwise movement within the hollow centers of said first-stage and second-stage sun gears and presenting an external gear movable by said endwise motion into engagement with the internal gear of either the first-stage or the second-stage sun gear, selectively, means driving said shuttle spool from the drive shaft of the motor, and manually controlled means for shifting the shuttle spool.

8. In a winch, a winding drum having a through-opening in its center presenting a full-length internal gear and provided at each end with a neck extending as a hollow prolongation of the drum, front and aft standards each presenting a respective bitt surrounding a related said neck, a journal bearing received between each bitt and its related neck, a respective seal at each end of the winch between the drum and the related bitt, a reversible hydraulic motor carried by the aft bitt to occupy an exposed position to the rear of the winch and providing a drive shaft extending axially of the drum into the hollow center of the neck which is prolonged from the aft end of the drum, a co-axial series of at least three gear systems housed in said open center of the drum, two adjacent said systems serving as a first-stage system and a second-stage system, respectively, and being each a planetary gear system having a respective carrier supporting a respective set of planetary pinions in mesh with the related sun gear, the other of said three gear systems serving as a last-stage system and having a central gear and a carrier supporting a set of pinions surrounding the central gear and in mesh therewith, the pinions of all of said gear systems being in mesh with the internal gear of the drum, said sun gears for both the first-stage and the second-stage gear systems of the series having a hollow center which is smooth-faced at the forward end and formed with an internal gear at the aft end, a spline connection to the front bitt from the carrier of the last-stage system of the series fixing said carrier against rotation, an operative interconnection causing the sun gear of the second-stage gear system and the central gear of the last-stage gear system of the series to rotate in unison with the carrier of the preceding system of the series, a set of normally separated friction brake discs splined, alternately, to the drum and to the carrier of the first-stage system of the series, a shuttle spool received for endwise movement within the hollow centers of the sun gears of the first-stage and second-stage gear system and presenting an external gear movable by said endwise motion from a neutral position within the smooth-faced portion of the sun gears into selective engagement with the internal gear of either of said two sun gears, means driving said shuttle spool from the drive shaft of the motor, manually controlled means for shifting the shuttle spool, and manually controlled means for imparting such an endwise thrust to the set of friction discs as will set the brake, the last-named means including a self-aligning bushing secured against relative endwise motion in the smooth-faced portion of the sun gear of said second-stage system of the series.

9. Structure according to claim 8 in which the splined portion of the carrier of the last-stage system of the series extends forwardly as an axial prolongation and has a hollow center formed with a radially developed groove for tracking movement of a cage-carried set of balls, and wherein a screw complement of the nut which said internally grooved prolongation produces is operatively interconnected with said bushing by a rearwardly extending stem so that wrist motion given to the screw transmits endwise motion to the bushing.

10. Structure according to claim 9 in which the screw also provides a forwardly extending stem exposed by its extreme end beyond the front bitt, said screw and both stem extensions thereof being hollow, and a selector shaft received through said hollow centers with its aft end connected for unitary endwise motion to the shuttle spool and its forward end exposed beyond the exposed end of said forwardly extending stem, the manual controls for activation of the brake and for activation of the shuttle spool being connected one to the exposed end of the stem and the other to the exposed end of the selector shaft.

11. Structure according to claim 9 in which the screw also provides a forwardly extending stem exposed by its extreme end beyond the front bitt, said screw and both stem extensions thereof being hollow, and a selector shaft received through said hollow centers with its aft end connected for unitary endwise motion to the shuttle spool and its forward end exposed beyond the exposed end of said forwardly extending stem, the manual control for activation of the brake comprising a radial arm attached to the exposed end of the stem so as to impart wrist movement thereto by swing motion of the arm about the center of the stem as an axis, the manual control for activation of the shuttle spool comprising a lever of the first order fulcrumed to the radial arm for fore-and-aft swing motion with one end attached to the exposed end of the selector shaft and upon the other end presenting a handle the movement of which permits selective operation of both the lever and the arm, releasable means being provided for locating the arm and the lever in selective settings.

References Cited in the file of this patent

UNITED STATES PATENTS

| | | |
|---|---|---|
| 1,763,023 | Tyler | June 10, 1930 |
| 2,458,459 | Wright | Jan. 4, 1949 |
| 2,500,326 | Shaff | Mar. 14, 1950 |
| 2,601,151 | Keller | June 17, 1952 |

FOREIGN PATENTS

| | | |
|---|---|---|
| 722,997 | Great Britain | Feb. 2, 1955 |